[19] United States Patent
Kim

[11] Patent Number: 5,924,540
[45] Date of Patent: Jul. 20, 1999

[54] SELECTOR LEVER LOCK DEVICE FOR AN AUTOMATIC TRANSMISSION IN A MOTOR VEHICLE

[75] Inventor: Kyu Chae Kim, Seoul, Rep. of Korea

[73] Assignee: Daewoo Motor Co., Ltd., Inchon, Rep. of Korea

[21] Appl. No.: 08/860,753

[22] PCT Filed: Nov. 22, 1995

[86] PCT No.: PCT/KR95/00154

§ 371 Date: Jul. 8, 1997

§ 102(e) Date: Jul. 8, 1997

[87] PCT Pub. No.: WO97/18969

PCT Pub. Date: May 29, 1997

[51] Int. Cl.$^6$ .................................................. B60K 41/26
[52] U.S. Cl. ...................... 192/220.4; 74/483 R
[58] Field of Search ........................ 192/220.4, 220.7, 192/220.2, 220.3; 74/483 R, 473.28, 473.27

[56] References Cited

U.S. PATENT DOCUMENTS

| | | | |
|---|---|---|---|
| 4,187,935 | 2/1980 | O'Hern | 192/220.2 |
| 4,880,092 | 11/1989 | Kito et al. . | |
| 4,905,802 | 3/1990 | Gotoh | 192/220.4 X |
| 4,934,496 | 6/1990 | Barske et al. | 192/220.4 |
| 5,016,738 | 5/1991 | Shirahama et al. . | |
| 5,036,962 | 8/1991 | Amagasa | 74/483 R X |
| 5,062,509 | 11/1991 | Carpenter et al. | 192/220.7 X |
| 5,080,208 | 1/1992 | Sakuma et al. | 74/483 R X |
| 5,133,222 | 7/1992 | Hansson . | |
| 5,186,069 | 2/1993 | Asano et al. | 192/220.4 X |
| 5,255,570 | 10/1993 | Shirahama et al. | 74/483 R X |
| 5,275,065 | 1/1994 | Ruiter | 74/483 R |
| 5,309,784 | 5/1994 | Kobayashi et al. | 74/527 X |
| 5,379,871 | 1/1995 | Asano et al. | 74/483 R X |
| 5,435,424 | 7/1995 | Murakami et al. | 192/220.7 |
| 5,490,585 | 2/1996 | Togano | 74/483 R X |

FOREIGN PATENT DOCUMENTS

| | | |
|---|---|---|
| 0307846 | 3/1989 | European Pat. Off. . |
| 0612640 A2 | 8/1994 | European Pat. Off. . |

*Primary Examiner*—Rodney H. Bonck
*Attorney, Agent, or Firm*—Staas & Halsey

[57] ABSTRACT

A selector lever lock device for an automatic transmission in a motor vehicle includes a tilt lever (36) pivotally attached to an upright detent plate (24) for pivotal movement about a pivot axis (38) into a lock or release position to allow or prevent free movement of a detent pin carried by the selector lever (12). The tilt lever (36) is provided with first (40) and second arm portions (42) each extending from the pivot axis (38) in different directions, the first arm portion (40) having at its distal end a claw (44) which serves to keep the detent pin (22) from moving downwards. Remaining engaged with the second arm portion (42) of the tilt lever is a solenoid mechanism that responds to the depression of the brake pedal (10) for causing the tilt lever (36) to rotate into the release position to thereby allow the detent pin (22) to move freely so that the selector lever (12) can be shifted to non-parking positions. A compression spring (60) is retained between the solenoid mechanism and the second arm portion (42) to bias the tilt lever (36) into the lock position.

8 Claims, 3 Drawing Sheets

SELECTOR LEVER LOCK DEVICE FOR AN AUTOMATIC TRANSMISSION IN A MOTOR VEHICLE

FIELD OF THE INVENTION

The instant invention is generally directed to a motor vehicle equipped with an automatic transmission and, more specifically, to a selector lever lock device whereby a selector lever can be selectively locked or released in a parking position depending on the operative condition of a brake pedal.

DESCRIPTION OF THE PRIOR ART

As widely known in the art, an automatic transmission type motor vehicle is provided with a selector lever shiftable to various positions, thus causing the automatic transmission to operate in different modes. Typical shift positions of the selector lever include a parking position for the mechanical fixing of a transmission output shaft, a reverse position in which the motor vehicle is allowed to move rearward, a neutral position wherein the transmission remains disconnected from an engine and a drive position which permits a plurality of forward gears to be selected automatically depending primarily on the vehicle speed and the throttle opening degree. Optionally and additionally, it may be possible or necessary for the automatic transmission to have, e.g., a second gear position which delimits the forward gear selection to a second gear or less and a first gear position which enables the motor vehicle to move forward with a first gear alone. The selector lever of typical design has a push button at its top knob portion which should be pressed beforehand to shift the selector lever from the parking position to other positions and vice versa. Provision of the push button is to avoid any unwanted shifting of the selectorlever again the driver's desire.

Unlike the motor vehicle with a manually shiftable transmission, it suffices in the automatic transmission vehicle merely to displace the selector lever from the parking position or the neutral position to one of the drive, reverse, second gear and first gear positions to provide an appropriate linkage between the engine and the drive wheels. Once the engine is started up with the selector lever remaining in the parking position, it becomes necessary to depress the brake pedal in order to keep the vehicle immovable throughout the process of changing the selector lever positions. Shifting the selector lever out of the parking position without depressing the brake pedal may lead to an accident that the vehicle comes to move suddenly and unintentionally in a forward or reverse direction, colliding with the environmental obstacles inclusive of human beings. To prohibit such accident from occurrence, there have been proposed in the art a wide variety of shift locks whereby the selector lever can be prevented from any displacement unless the brake pedal is depressed firstly.

U.S. Pat. No. 4,187,935 issued to O'Hern on Feb. 12, 1980 discloses a steering column type gear selector lock structure which is operative to unlock the gear selector of a vehicle against movement from a non-drive position to a drive position thereof when the lock structure is in the locked position. The lock structure is spring-biased toward the locked position and an electric solenoid is operatively associated with the gear lock structure for shifting the latter from the locked position to the unlocked position when the solenoid is electrically actuated. The solenoid is electrically connected to the brake light circuit of the vehicle and is, therefore, actuated when the brake pedal of the vehicle is moved from the brake release position to the brake applied position. The gear selector of the vehicle and the lock structure include a coacting structure whereby the gear selector may turn the lock structure from the locked position to the unlocked position and thereafter release the lock structure for movement to the locked position upon movement of the gear selector from the drive position to the non-drive position in which the gear selector is locked until such time as the brake pedal of the vehicle is depressed to activate the solenoid and thereby cause the lock structure to be shifted from the locked position to the unlocked position thereof.

U.S. Pat. No. 4,934,496 issued to Barske et al. on Jun. 19, 1995 teaches a floor type control mechanism for automatic transmission in a motor vehicle to prevent operation of a selector lever under certain conditions. For example, the selector lever can be locked into the parking position and shifted out of this position only after the brake pedal has been operated. The locking mechanism includes a manually controllable catch mechanism which may cooperate with an electromagnetically operated mechanism to achieve the desired selector lever control.

U.S. Pat. No. 4,905,802 issued to Gotoh on Mar. 6, 1990 describes a selector lever apparatus comprising a selector lever and a detent pin arranged on the selector lever so as to be moved between a first position at which the detent pin is engaged with a detent plate and a second position at which the engagement with the detent plate is released. The selector lever can be shifted among a plurality of mode setting positions including a parking position. The apparatus further comprises a lock cam having a first engaging portion with which the detent pin may engage when the selector lever is shifted to the parking position, the lock cam interlocked with movement of the detent pin while the selector lever is at the parking position, so that the lock cam can assume a lock position when the detent pin is moved to the first position and a release position when the detent pin is moved to the second position. A selector lever lock mechanism is provided for restricting movement of the detent pin by locking the lock cam to the lock position when a brake pedal is not depressed while the lock cam is located at the lock position, and for releasing the lock cam when the brake pedal is depressed.

Although the prior art shift control or lock mechanisms referred to above are designed to perform what is called "shift lock function" in their own way, need exists for an improved selector lever lock device that can offer significant advantages over the prior art mechanisms in terms of compactness, mountability and reliability.

SUMMARY OF THE INVENTION

Accordingly, it is an object of the invention to provide a selector lever lock device which has an enhanced compactness and mountability, and which is easy to retrofit existing motor vehicles as well as reliably operable for an extended period of time.

With this object in view, the present invention provides a selector lever lock device for an automatic transmission in a motor vehicle, the motor vehicle having a brake pedal depressible to stop the vehicle and a selector lever operatively associated with the automatic transmission for selective angular movement about a first pivot axis to one of parking, reverse, neutral and drive positions, the selector lever having a detent pin movable in a lengthwise direction thereof. A detent plate is adapted to extend substantially parallel to the selector lever and has a plurality of indentations, including a parking indentation, corresponding to the positions of the selector lever, each of the indentations cooperating with the detent pin to maintain the selector lever in a selected position. One important feature of the invention is that a tilt lever is pivotally attached to the detent plate at opposite side thereof from the selector lever for pivotal movement about a second pivot axis into a lock position and a release position relative to the detent pin, the tilt lever having first and second arm portions each extending from the second pivot axis in different directions, the first arm portion provided at its distal end with a claw which inhibits movement of the detent pin out of the parking indentation when the tilt lever remains in the lock position. A compression spring is utilized to bias the tilt lever into the lock position. Moreover, an electromagnetic actuator is fixedly mounted to the detent plate and operatively connected to the second arm portion of the tilt lever. Responsive to the depression of the brake pedal, the actuator is designed to cause the tilt lever to rotate against the compression spring into the release position to thereby allow the detent pin to move out of the parking indentation so that the selector lever can be shifted to non-parking positions.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 1:
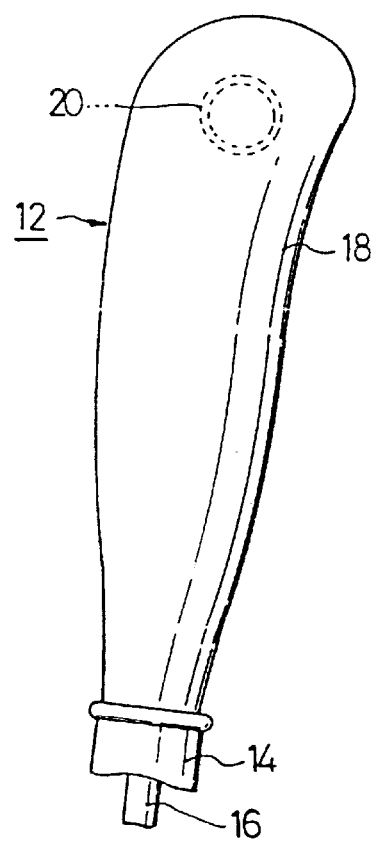
FIG. 1 is a side elevational view of the instant selector lever lock device wherein a tilt lever is indicated both in a solid and in a phantom line depending on its position.
Figure 1:
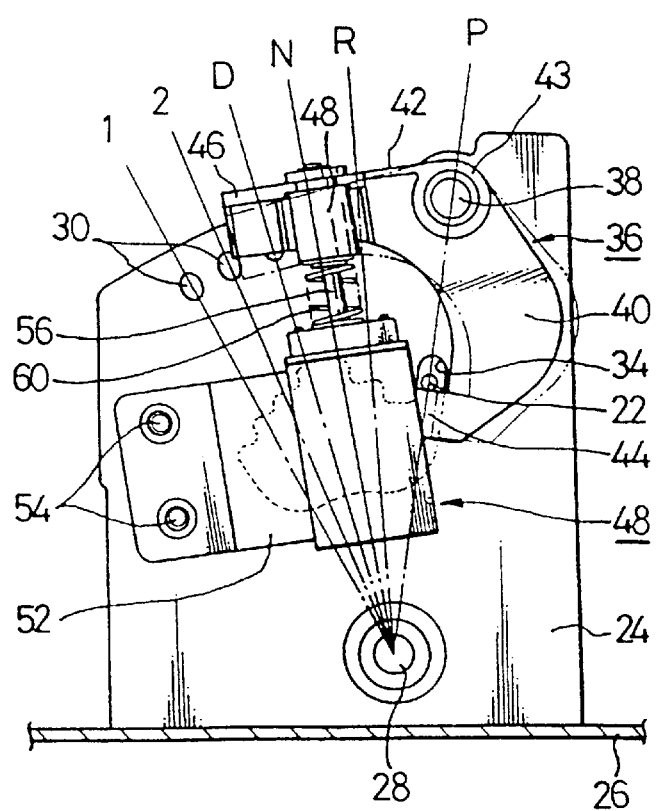
Figure 2:
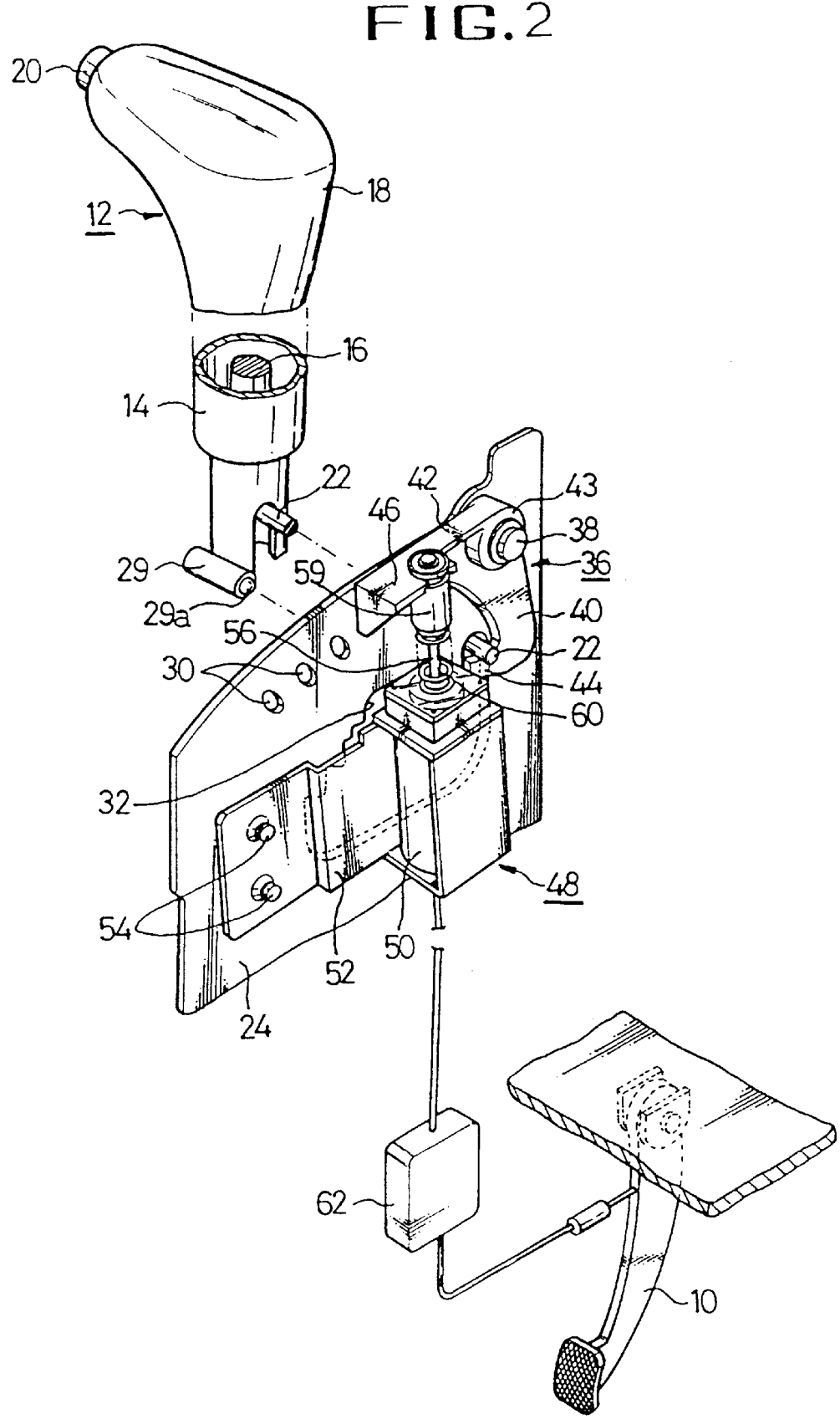
FIG. 2 is an exploded perspective view showing the selector lever lock device and the brake pedal, with portions thereof removed for illustration.

Referring now to FIGS. 1 and 2, it can be appreciated that a selector lever lock device embodying the invention is applied to a typical automatic transmission in a motor vehicle. The motor vehicle includes, among other components, a brake pedal 10 depressible by a foot of the driver to make the vehicle unable to move forward or in a reverse direction. Extending upward from the floor of the motor vehicle is a selector lever 12 operatively associated with the automatic transmission for selective angular movement to one of parking, reverse, neutral and drive positions, as best illustrated in FIG. 1.

The selector lever 12 is composed of a hollow shank 14, an elongated rod 16 extending through the hollow shank 14 for elevational movement within a limited extent, the rod 16 normally biased upward by means of a return spring not shown in the drawings, ad a knob 18 attached to the distal end of the hollow shank 14. Arranged on the knob 18 is a push button 20 that, when pushed inwardly, will cause the elongated rod 16 to move downwards against the return spring. The elongated rod 16 has at its lower end a detent pin 22 which extends a short distance from the rod 16 at a right angle with respect thereto. The detent pin 22 is normally retained in a an upper position and may move into a lower position as the elongate rod 16 ascends upon actuation of the push button 20 by the driver.

The hollow shank 14 of the selector lever 12 is pivotally attached at its proximal end to a detent plate 24 which in turn is mounted on a vehicle body 26. This allows the selector lever 12 to be angularly shifted about a pivot axis 28 between various positions, e.g., parking position (P), reverse position (R), neutral position (N), drive position (D), second gear position (2) and first gear position (1), thus making the automatic transmission operable in a specific mode corresponding exactly to the position of the selector lever 12. Although not shown in any of the drawings, the pivot axis 28 is operatively connected to a selector valve which serves to control hydraulic pressure in the automatic transmission.

To assure that the selector lever 12 should be firmly kept at a selected position until the next shifting operation begins, a ball plunger 29 is affixed to the hollow shank 14 of the selector lever 12 to cooperate with an array of locator holes 30 each formed through the thickness of the detent plate 24 at such locations as to exactly correspond to the positions (P, R, N, D, 2 or 1) or the selector lever 12, as explicitly noted in FIG. 2. The ball plunger 29 is provided with a spring-biased ball 29a which will be normally urged against one flank surface of the detent plate 24. As the selector lever 12 is moved to a particular shift position, the spring-biased ball 29a will come into engagement with one of the locator holes 30, deterring the selector lever 12 from any unwanted movement out of the particular shift position. Applying a shifting force to the selector lever 12 sometime later will cause the spring-biased ball 29a to disengage with the locator holes 30.

The detent plate 24 is adapted to extend upward from the vehicle body 26 in a substantially parallel relationship with the selector lever 12. As indicated in FIG. 1, the detent plate 24 has an aperture 32 of generally mitt shape at its central region which defines a plurality of indentations, including a parking indentation 34, corresponding to the positions of the selector lever 12, along the top contour line thereof. Each of the indentations is designed to cooperate with the detent pin 22 to maintain the selector lever 12 in a position selected by the driver. It can be seen in FIGS. 1 and 2 that, when the selector lever 12 is in the parking position, the detent pin 22 can engage with the parking indentation 34 of inverted U-shape, in which position the detent pin 22 cannot escape from the parking indentation 34 unless the push button 20 is depressed.

Among the important features of the instant invention is that a tilt lever 36 is pivotally secured to the opposite side of the detent plate 24 from the selector lever 12 by means of a pivot axis 38 and a snap ring 39 for pivotal movement about the pivot axis 38 into a lock position shown in a solid line in FIG. 1 and a release position illustrated in a phantom line. The pivot axis 38 of the tilt lever 36 is spaced apart or offset from the pivot axis 28 about which the selector lever 12 is subjected to an angular movement.

Figure 3:
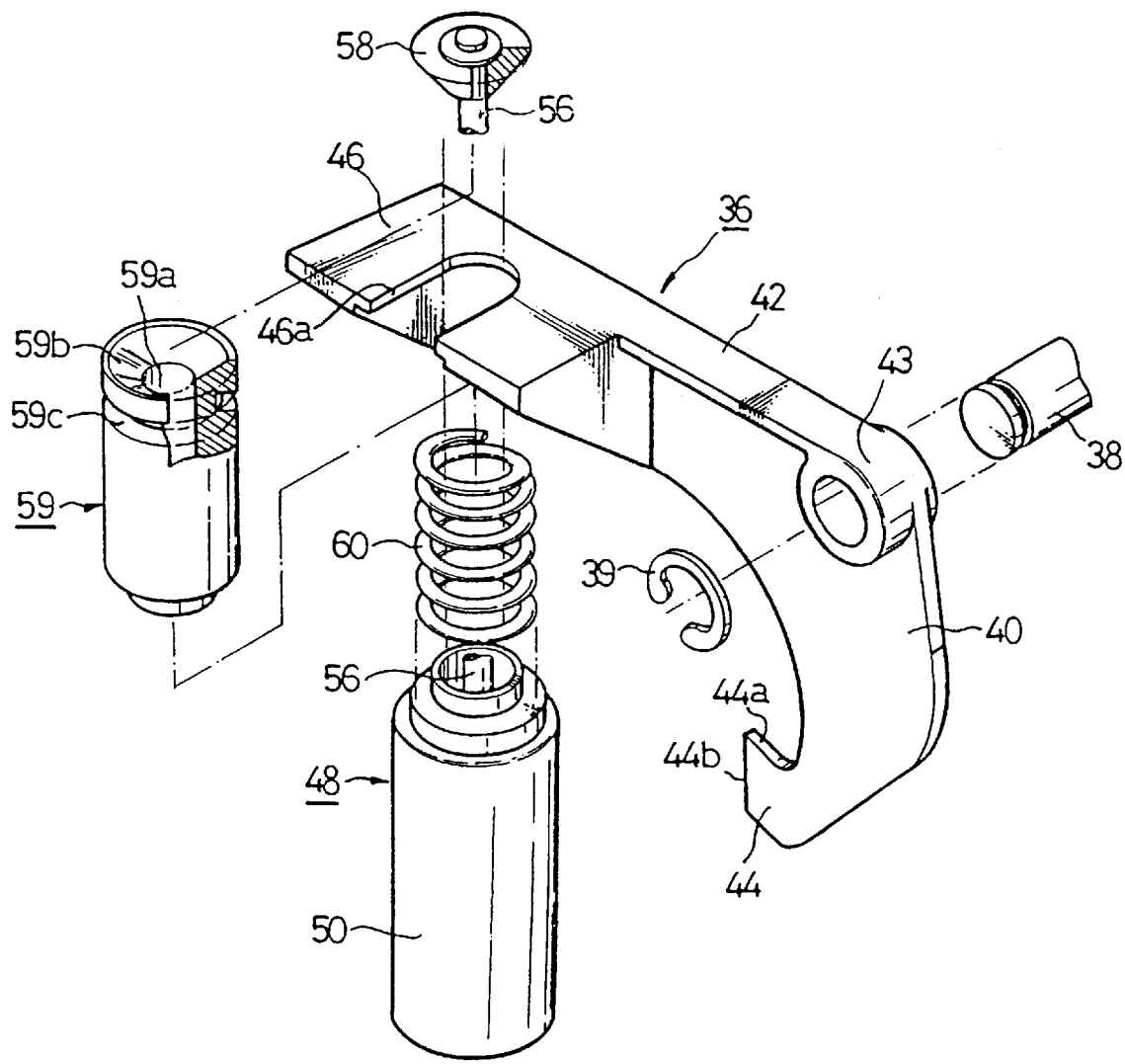
FIG. 3 shows in greater detail a tilt lever, a solenoid mechanism and a compression spring, which are designed to cooperate with each other to lock or unlock the selector lever in a parking position.

As most clearly shown in FIG. 3, the tilt lever 36 consists of first and second arm portions 40, 42 each extending from a hub 43 in different directions, preferably to form a right angle with each other. The first arm portion 40 of the tilt lever 36 is provided at its distal end a claw 44 which functions to inhibit movement of the detent pin 22 out of the parking indentation 34 into non-parking ones while the tilt lever 36 remains in the lock position. In the illustrated embodiment, the claw 44 on the first arm portion 40 has a shoulder surface 44a suitable for abutment to the detent pin 22 when the latter is locked in the parking indentation 34 and a nose surface 44b for making contact with the detent pin 22 as the latter is returned to the parking indentation 34 from other indentations. The second arm portion 42 is provided with a flank wing 46 projecting generally perpendicularly from one side of the second arm portion 42. Formed on the flank wing 46 is a generally U-shaped slot 46a having an end opened at the tip of the flank wing 46.

Referring collectively to FIG. 1 through 3, it can be readily seen that an electromagnetic actuator or solenoid 48 is fixedly mounted to the detent plate 24 on the same side as the tilt lever 36 lies. The solenoid 48 includes a cylindrical coil housing 50 supported by a bracket 52 which in turn is rigidly affixed to the detent plate 24 as by virtue of a bolt-and-nut fastener 54 or other suitable fastening means. A plunger 56 with a stop head 58 of inverted conical shape is extendibly fitted to the coil housing 50 in such a manner that it can be retracted upon activation of the solenoid 48. Deactivation of the solenoid 48 allows the plunger 56 to be fully extended.

An adaptor 59 made from rubber or like resiliently deformable material may preferably utilized to couple the end extension of the plunger 56 to the second arm portion 42 of the tilt lever 36. As best depicted in FIG. 3, the adaptor 59 has an axial bore 59a through which the plunger 56 is inserted snugly, a top concave surface 59b so configured as to accommodate the stop head 58 of the plunger 56 and an annular groove 59c which enables the adaptor 59 to be fitted to the flank wing 46 of the tilt lever 36 through the open end of the U-shaped slot 46a. Apparently, the adaptor 59 of this construction helps provide a flexible coupling between the plunger 56 and the tilt lever 36, assuring a noise-free and smooth transmission of the retraction force from the plunger 56 to the tilt lever 36. A compression spring 60 is retained between the top end of the coil housing 50 and the bottom end of the adaptor 59 so as to coaxially surround the plunger 56. It should be noted that the solenoid 48, the plunger 56 and the compression spring 60 are all lies on a plane substantially parallel to the detent plate 24. With this unique arrangement, the compression spring 60 will normally bias the tilt lever 36 into the lock position unless the solenoid 48 is energized in response to the actuation of the brake pedal 10.

As shown in FIG. 2 only, the solenoid 48 is electrically connected to the brake pedal 10 by way of a driving unit 62 that, responsive to the depression of the brake pedal 10, will cause a power source or battery (not shown) to apply electric current to the solenoid 48, thus rendering the latter activated. In case where the brake pedal 10 is not depressed, the driving circuit 62 will disconnect the solenoid 48 from the power source to make the plunger freely extendible.

In operation, when the selector lever 12 is in the parking position as depicted in FIG. 1, the detent pin 22 thereof will be kept in the parking indentation 34 by an upward biasing force acting on the elongated rod 16. Unless and until the brake pedal 10 is operated, no electric current will be fed to the solenoid 48 whereby the plunger 56 is outwardly extended by virtue of the biasing force of the compression spring 60 and, at the same time, the tilt lever 36 is rotated clockwise into the lock position as illustrated in a solid line in FIG. 1, ensuring that the detent pin 22 should be locked in the parking indentation 34 just above the claw 44 of the tilt lever 36. As a result, the selector lever 12 becomes unable to be shifted from the parking position to any other positions.

Upon the brake pedal 10 being depressed, the solenoid 48 will be activated to forcedly retract the plunger 56 against the biasing force of the compression spring 60. This will cause the tilt lever 36 to turn counterclockwise into the release position as shown in a phantom line in FIG. 1, in which position the claw 44 of the tilt lever 36 is moved away from the entrance of the parking indentation 34. Depression of the push button 20 under that state will result in a downward displacement of the detent pin 22 out of the parking indentation 34, permitting the selector lever 12 to be freely shifted to a desired position (R, N, D, 2 or 1) from the parking position. This means that the selector lever 12 is enabled to move out of the parking position only at the time of depression of the brake pedal 10, which can help the driver avoid any unexpected, sudden movement of the motor vehicle.

In the event that the selector lever 12 gets back to the parking position, the detent pin 22 can enter into the parking indentation 34 without making contact with the claw 44 of the tilt lever 36, so long as the brake pedal 10 is depressed to place the tilt lever 36 in the release position. In case of non-depression of the brake pedal 10, however, the detent pin 22 will collide with the nose surface 44b on the claw 44 of the tilt lever 36, thereby pushing the tilt lever 36 toward the release position before it finally moves upward into the parking indentation 34.

While the invention has been described with reference to a preferred embodiment, it should be apparent to those skilled in the art that many changes and modifications may be made without departing from the spirit and scope of the invention as defined in the claims.

What is claimed is:

1. A shift lock device for an automatic transmission in a motor vehicle, the motor vehicle having a brake pedal depressable to keep the vehicle immovable, comprising:

a selector lever for selective angular movement about a first pivot axis to one of parking, reverse, neutral, and drive positions, the selector lever having a detent pin movable in a lengthwise direction thereof a detent plate extending substantially parallel to the selector lever and having a plurality of indentations, including a parking indentation, corresponding to the positions of the selector lever, each of the indentations cooperating with the detent pin to maintain the selector lever in a selected position;

a tilt lever pivotally attached to the detent plate for pivotal movement about a second pivot axis between a lock position and a release position relative to the detent pin, the tilt lever having first and second arm portions each extending in different directions, the first arm portion provided at its distal end with a claw which inhibits movement of the detent pin out of the parking indentation when the tilt lever remains in the lock position;

means for biasing the tilt lever into the lock position;

actuator means remaining engaged with the second arm portion of the tilt lever and responsive to the depression of the brake pedal for causing the tilt lever to rotate against the biasing means into the release position to thereby allow the detent pin to move out of the parking indentation so that the selector lever can be shifted to non-parking positions, the actuator means comprising a solenoid having a cylindrical coil housing attached to the detent plate and a plunger extendably held by the coil housing, for retraction when the solenoid is subjected to activation, the plunger operatively connected at its free end to the second arm portion of the tilt lever whereby the tilt lever is enabled to turn into the release position in response to the retraction of the plunger; and an adaptor fitted to the second arm portion of the tilt lever for providing a flexible coupling between the plunger and the second arm portion of the tilt lever, the adaptor having an axial bore through which the plunger is inserted.

2. The shift lock device as recited in claim 1, wherein the adaptor is made from rubber.

3. The shift lock device as recited in claim 1, wherein the biasing means comprises a compression spring retained between the coil housing of the solenoid and the adaptor so as to coaxially surround the plunger.

4. The shift lock device as recited in claim 3, wherein the solenoid, the plunger and the compression spring lie on a plane generally parallel to the detent plate and wherein the second pivot axis about which the tilt lever is caused to rotate is offset from the first pivot axis of the selector lever.

5. The shift lock device as recited in claim 1, wherein the tilt lever has a slot formed at the second arm portion thereof to immovably hold the adaptor.

6. The shift lock device as recited in claim 1, wherein the claw on the first arm portion of the tilt lever is provided with a shoulder surface on which the detent pin rests when it is locked in the parking indentation and a nose surface for making contact with the detent pin as the detent pin is being moved into the parking indentation with no depression of the brake pedal.

7. The shift lock device as recited in claim 1, further comprising means responsive to the depression of the brake pedal for feeding electric current to the solenoid to have it activate whereby the plunger can be retracted to rotate the tilt lever into the release position.

8. The shift lock device as recited in claim 1, wherein the detent plate includes an array of locator holes each formed in a position corresponding to positions of the selector lever and wherein the selector lever is provided with a ball plunger cooperating with the locator holes to hold the selector lever in a selected position.

* * * * *